(12) United States Patent
Sokol et al.

(10) Patent No.: US 9,744,618 B2
(45) Date of Patent: Aug. 29, 2017

(54) TEMPORAL PULSE SHAPING FOR LASER SHOCK PEENING

(71) Applicant: LSPT Technologies, Inc., Dublin, OH (US)

(72) Inventors: David Sokol, Dublin, OH (US); Jeff Dulaney, Delaware, OH (US); Allan Clauer, Worthington, OH (US)

(73) Assignee: LSP TECHNOLOGIES, INC., Dublin, OH (US)

( * ) Notice: Subject to any disclaimer, the term of this patent is extended or adjusted under 35 U.S.C. 154(b) by 213 days.

(21) Appl. No.: 14/720,738

(22) Filed: May 23, 2015

(65) Prior Publication Data

US 2015/0336208 A1    Nov. 26, 2015

Related U.S. Application Data

(60) Provisional application No. 62/002,176, filed on May 22, 2014.

(51) Int. Cl.
| | |
|---|---|
| *B23K 26/00* | (2014.01) |
| *B23K 26/06* | (2014.01) |
| *H01S 3/00* | (2006.01) |
| *G02B 27/28* | (2006.01) |
| *B23K 26/0622* | (2014.01) |

(52) U.S. Cl.
CPC ........ *B23K 26/0069* (2013.01); *B23K 26/063* (2013.01); *B23K 26/0622* (2015.10); *H01S 3/0057* (2013.01); *H01S 3/0085* (2013.01)

(58) Field of Classification Search
CPC . B23K 26/0069; B23K 26/063; H01S 3/0057; H01S 3/0085; G02B 27/286
USPC ............. 219/121.61, 121.62, 121.83, 121.85
See application file for complete search history.

(56) References Cited

U.S. PATENT DOCUMENTS

| | | | | |
|---|---|---|---|---|
| 5,932,120 | A * | 8/1999 | Mannava | C21D 10/005 148/525 |
| 6,159,619 | A * | 12/2000 | Rockstroh | C21D 10/005 148/565 |
| 6,191,385 | B1 * | 2/2001 | O Loughlin | B23K 26/702 219/121.6 |
| 6,197,133 | B1 * | 3/2001 | Unternahrer | B23K 26/0622 148/525 |

* cited by examiner

*Primary Examiner* — Samuel M Heinrich
(74) *Attorney, Agent, or Firm* — Benesch, Friedlander, Coplan & Aronoff LLP

(57) ABSTRACT

Methods, systems, and apparatuses are disclosed for temporal pulse shaping of laser pulses used in laser shock peening applications. In one embodiment, a system for temporal pulse shaping of a laser beam used for laser shock peening comprises a laser; a modulator; a high voltage driver, a waveform generator, a polarizer, and an optical amplifier.

5 Claims, 4 Drawing Sheets

TEMPORAL PULSE SHAPING FOR LASER SHOCK PEENING

CROSS-REFERENCE TO RELATED APPLICATIONS

This application claims priority from U.S. Provisional Patent Application No. 62/002,176, filed on May 22, 2014, which is incorporated by reference herein in its entirety.

BACKGROUND

The laser shock peening ("LSP") process, a substitute process for traditional shot peening, is a cold working process used to produce a compressive residual stress layer and modify mechanical properties of materials by impacting the material with enough force to create plastic deformation. The residual stresses created by the LSP process increase a material's resistance to fatigue and stress, and the LSP process can be used to strengthen and harden materials. LSP uses high energy laser pulses to lase both transparent and opaque overlays on a surface of a workpiece to generate a plasma plume and cause a rapid rise of pressure on the surface of a workpiece. This pressure creates and sustains a shockwave, which propagates through a workpiece material. The shockwave generated by LSP induces cold work into the microstructure of the workpiece material and contributes to the increased performance of the workpiece material. As the shockwave travels into the workpiece, some of the energy of the wave is absorbed during the plastic deformation of the workpiece material. This is also known as cold working. The shockwave permanently stretches the internal structure of the workpiece material. This plastic deformation generates compressive residual stresses in the workpiece material, and increases the strength of the workpiece material. LSP uses a laser pulse width of about 5 nanoseconds (ns) to about 40 ns and a typical spot diameter for a laser beam in LSP is about 1.0 to about 6.0 mm. Fluence is the measure of energy delivered per unit area, and in LSP applications, fluence is typically over 100 J/cm$^2$.

The present application appreciates that customizing a laser pulse for LSP applications may be a challenging endeavor.

SUMMARY

Systems and methods are provided for temporal pulse shaping of a pulsed laser beam used in LSP applications.

In one embodiment, a system for temporal pulse shaping of a laser beam used for laser shock peening is provided, the system comprising: a laser; a modulator; a high voltage driver; a waveform generator; a polarizer; and an amplifier.

In another embodiment, a system for temporal pulse shaping of a pulsed laser output used for laser shock peening is provided, the system comprising: a laser operable to produce a pulsed laser beam, wherein the laser is at least one of: a diode pumped continuous wave laser, a diode pumped fiber laser, and a long pulse laser oscillator; a modulator operable to modulate the pulsed laser beam, wherein the modulator is at least one of: an electro-optic modulator, an acousto-optic modulator, and an electro-optic Pockels cell; a high voltage driver operable to output a high voltage signal in response to an input waveform, the high voltage driver operatively connected to the modulator and a waveform generator; the waveform generator, wherein the waveform generator is operable to generate at least one waveform in response to a trigger signal from a processor, wherein the at least one waveform is input into the high voltage driver to generate the high voltage signal; a polarizer, comprising a first polarization direction; and an amplifier, the amplifier operable to amplify the modulated pulsed laser beam to output an amplified, modulated, pulsed laser beam.

In another embodiment, a method for temporal pulse shaping of a laser beam used in laser shock peening of a workpiece is provided, the method comprising the acts of: (1) determining at least one of: a desired magnitude of residual stress, and a desired depth of residual stress, at one or more locations on the workpiece and selecting a pulse width and a temporal profile of the laser beam corresponding to the at least one of: the desired magnitude of residual stress, and the desired depth of residual stress; (2) generating the laser beam with a laser and inputting the laser beam into a modulator; (3) generating a waveform from a waveform generator, wherein the waveform is based on the selected pulse width and the selected temporal profile; (4) inputting the generated waveform into a high voltage driver to output a high voltage signal; (5) inputting the high voltage signal into the modulator to modulate and shape a temporal profile of the laser beam based on the selected pulse width and the selected temporal profile; (6) amplifying the modulated and shaped laser beam with an optical amplifier; (7) delivering the amplified, modulated, and shaped laser beam to the one or more locations on the workpiece; and (8) repeating steps 1-7 for each subsequent location on the workpiece.

BRIEF DESCRIPTION OF THE DRAWINGS

The accompanying figures, which are incorporated in and constitute a part of the specification, illustrate various example systems, methods, and results, and are used merely to illustrate various example embodiments.

DETAILED DESCRIPTION

Embodiments claimed herein disclose temporal pulse shaping for laser pulses used in LSP applications. In LSP applications, real time variation of laser temporal profiles, including variations to both pulse width and pulse shape, is beneficial.

For LSP applications, short temporal laser pulses having pulse widths of less than about 10 ns may produce higher residual stresses on a surface of a workpiece, but a depth of residual stress for laser pulses at this pulse width may not adequately penetrate past a surface of a workpiece. Residual stress produced by a longer pulse, for example a pulse width of about 20 ns, may penetrate deeper into a workpiece. Thus, better fatigue resistance for a workpiece may be achieved by first processing a workpiece with a layer of 20 ns laser pulses followed by processing a workpiece with a layer of 10 ns laser pulses. Workpieces with varying thicknesses may also present problems in LSP applications requiring laser pulses with different temporal profiles. It may be beneficial to vary a temporal pulse width of a laser pulse in real time during LSP applications such that thinner sections of a workpiece may be processed with shorter laser pulses, and thicker sections be processed with longer laser pulses in a continuous processing cycle.

Figure 1:
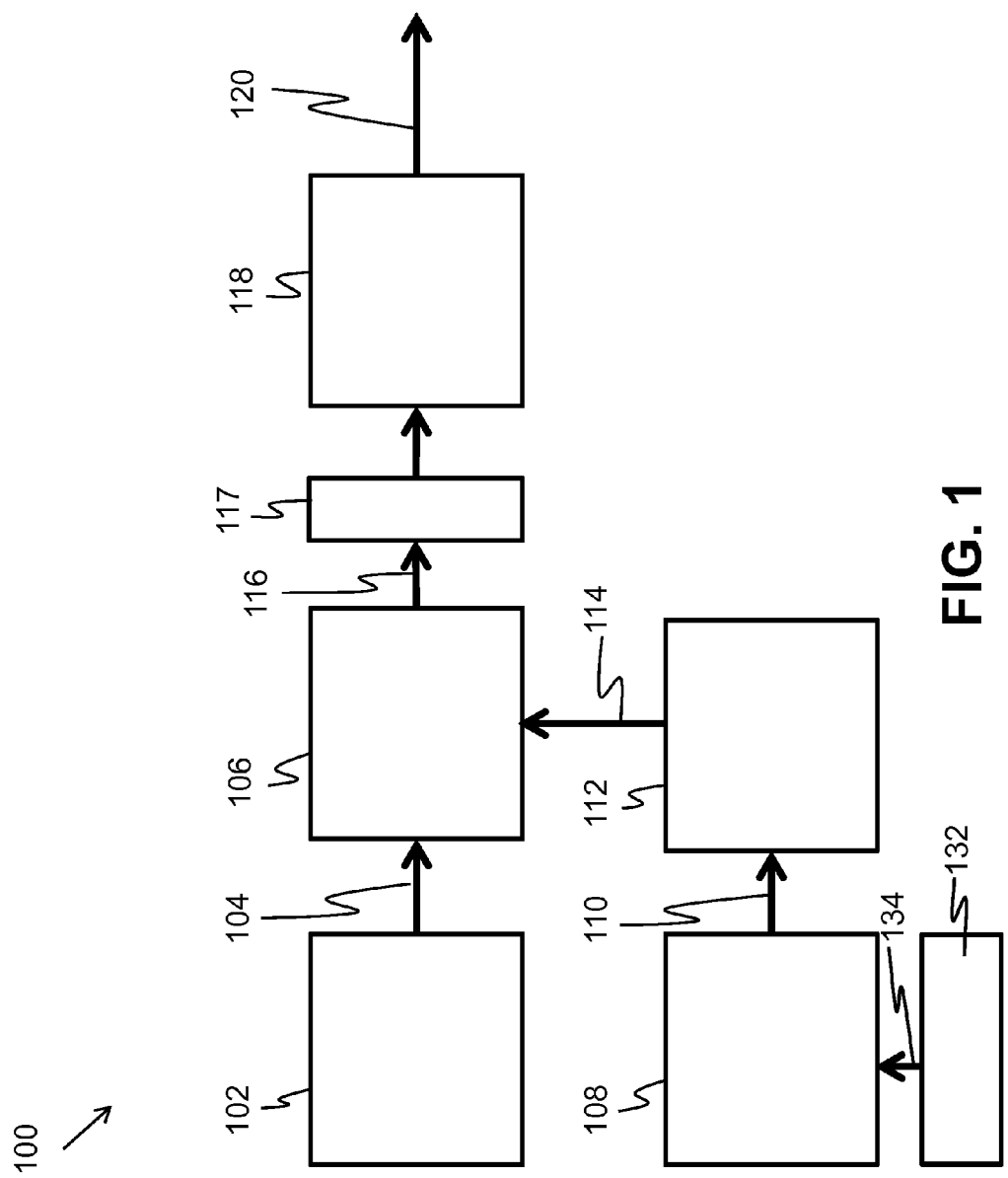
FIG. 1 illustrates a schematic view of an example system for temporal pulse shaping of a laser beam pulse.

With reference to FIG. 1, a schematic view of a system 100 for temporal pulse shaping of a laser pulse 104 is illustrated. System 100 for temporal pulse shaping of an input laser pulse 104 may include: a laser 102, a modulator 106, a waveform generator 108, a high voltage driver 112, a polarizer 117, an amplifier 118, and a processing device 132.

Laser 102 may be at least one of: a continuous wave (CW) laser, a CW fiber laser, a diode pumped CW laser, a diode pumped CW fiber laser, and a long pulse laser oscillator. Laser 102 may include a laser crystal such as a neodymium-doped YAG (Nd:YAG), neodymium-doped vanadate (ND:YVO$_4$), neodymium-doped YLF (Nd:YLF), or any other sold-state crystal material, in either a rod or a slab gain medium to produce a pulsed laser beam. Laser 102 may be configured to produce a pulsed laser beam for use in LSP applications. Laser 102 may be configured to deliver laser pulses having: a pulse energy of between about 1 J and about 50 J (at the output of the final amplifier module 118); wavelengths between about 1053 nm and about 1064 nm; and pulse widths of between about 5 ns and about 40 ns. Laser 102 may be configured as single frequency in a TEM$_{00}$ mode, as TEM$_{00}$ only, or setup to operate in multimode. As used herein, "laser" may refer to a laser oscillator alone, or a laser oscillator in addition to optical amplification.

Modulator 106 may be at least one of an electro-optic modulator, an acousto-optic modulator, and an electro-optic Pockels cell. In one embodiment, modulator 106 is a Pockels cell used with high voltage driver 112, waveform generator 108, and polarizer 117 to modify a temporal profile of input laser pulse 104. In one embodiment, Pockels cell 106 is a fast modulator operable to modulate in time measurable in a range of nanoseconds to picoseconds. Pockels cell 106 may comprise different types of crystals and cell sizes, and thus require different levels of voltage inputs for proper operation. Pockels cell 106 may require a voltage input in excess of 1,000 V and may use high voltage driver 112 to produce high voltages needed for proper operation. In another embodiment, modulator 106 is an acousto-optic modulator used with a lower power CW laser beam to cut out a temporal profile of a CW laser beam. In this embodiment, additional amplifiers are used to amplify a temporal profile cut out of a CW laser beam. Modulator 106 may be set up in a pulse slicer mode using high voltage driver 112 and polarizer 117 to produce a temporal profile of desired temporal pulse width and temporal pulse shape. In pulse slicer mode, high voltage driver 112 may provide high voltage signals to modulator 106 to rotate a polarization of input laser pulse 104. If the orientation of polarization axis of input laser pulse 104 aligns with an orientation of a polarization axis of polarizer 117, input laser pulse 104 may pass through polarizer 117 and further through system 100. In one embodiment, modulator 106 and polarizer 117 are set up to not allow transmission of input laser pulse 104. Varying a voltage used to operate modulator 106 may vary a degree of transmission, for example between 0-100%, of input laser pulse 104 through polarizer 117. Use of modulator 106 in pulse slicer mode may be used to shape a leading and a trailing edge of a temporal pulse profile for input laser pulse 104.

Figure 2:
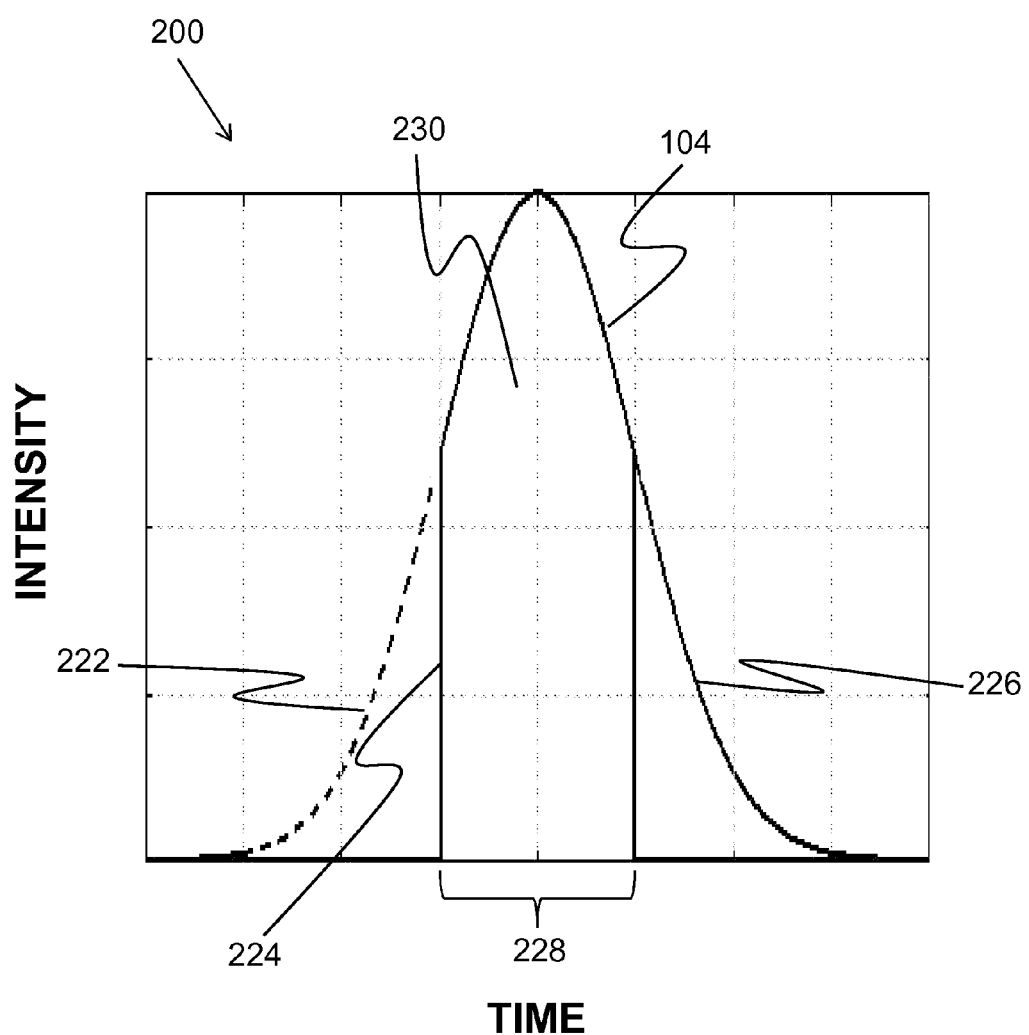
FIG. 2 illustrates an example modification to a temporal profile of a pulsed laser beam.

With reference to FIG. 2, a temporal profile 200 of an example input laser pulse 104 is illustrated. Temporal profile 200 of input laser pulse 104 may be substantially Gaussian in appearance. Leading edge 222 may be sliced off by modulator 106 operating in pulse slicer mode as described above, so as to produce a sharper leading edge 224. Sharp leading edge 224 may provide a faster rise time for input laser pulse 104. Trailing edge 226 may also be sliced off by modulator 106 to vary a pulse width 228 of laser pulse 104. In one embodiment, rise time of laser pulse 104 is less than about 5 ns.

Use of modulator 106 in pulse slicer mode may be used to shape a leading edge 222, and trailing edge 226 of input laser pulse 104, but use of modulator 106 in pulse slicer mode alone may not modify an interior shape 230 of input laser pulse 104 between leading edge 222 and trailing edge 226. Waveform generator 108 used with high voltage driver 112 and modulator 106 may be used to modify an interior shape 230 of input laser pulse 104. In one embodiment, modulator 106 used with waveform generator 108 and high voltage driver 112 are used to vary an amplitude of interior shape 230, and thus vary an energy level of input pulsed laser beam 104. Modulator 106 may be operable to vary a pulse width of input laser pulse 104 to a pulse width between about 5 ns and about 40 ns for use in LSP operations. Modulator 106 may be used to configure input laser pulse 104 in various temporal shapes. High voltage driver 112 may be used to control a modulation, for example, of input laser pulse 104 in modulator 106, with a high voltage signal 114 from high voltage driver 112 to modulator 106. Waveform generator 108 may be operable to control high voltage driver 112, modulator 106, and polarizer 117 by providing a unique waveform 110 to high voltage driver 112 to control an output of high voltage signal 114 from high voltage driver 112 to modulator 106. Waveform generator 108 may be similar to function generators used to produce different waveforms over a range of frequencies. Waveform generator 108 may produce waveforms 110 such as sine waves, square waves, triangle waves, sawtooth waves, and the like. A small voltage, for example from 0 to 5 V may be coupled to waveform 110 to vary an amplitude of waveform 110. Thus, by varying waveform and amplitude of waveform 110, a unique signal is provided to high voltage driver 112 to select a high voltage value to couple to waveform 110 to produce high voltage signal 114. High voltage signal 114 may be an amplified form of waveform 110. In one embodiment, waveform generator 108 produces waves with relatively small periods, for example in the order of nanoseconds to picoseconds to produce very high frequency waveforms in a frequency range of 1 GHz to 1 THz. In one embodiment, high voltage driver 112 outputting high voltage signal 114 to modulator 106 is controlled by waveform 110 from waveform generator 108.

As used herein, processing device 132 may be a computer, a computer processor, and the like, and may comprise memory to store an instruction set, such as software. Processing device 132 may be operable to execute an instruction set to control all or some components in system 100. Processing device 132 may be used to transmit one or more trigger signals/instruction sets 134 to waveform generator 108 to generate a waveform 110. Processing device 132 may provide an instruction set 134 to waveform generator 108 to create a unique time dependent voltage waveform 110. A unique waveform 110 may be generated by subdividing a waveform 110 into units of time dependent voltages. In one embodiment, waveform 110 is subdivided into a number of units between 1 unit and 1,500 units. Each unit may represent a voltage as a function of time to allow for unique time dependent voltage signals to be created. In one embodiment, processing device 132 may generate a unique time dependent voltage signal in lieu of waveform generator 108.

Waveform output 110 may be used as an input for high voltage driver 112 to create a unique high voltage signal 114. A transmission amount of laser pulse 104 from modulator 106 through polarizer 117 may be customized depending on high voltage signal 114 received by modulator 106. Modulator 106 may allow for 0 to 100% transmission of input laser pulse 104 through modulator 106 and polarizer 117, thus shaping a temporal profile of input laser pulse 104. Pulse waveforms 110, that may be operable to produce desired temporal pulse shapes of input laser pulse 104 in modulator 106, may be preloaded into processing device 132, and selected as needed to produce desired temporal pulse shapes for LBI applications. Processing device 132 may be integrated into waveform generator 108, or processing device 132 may be remote from system 100, and operatively connected to waveform generator 108, for example, through trigger signal 134/instruction set 134. In one embodiment, a user can program LSP processing instructions into processing device 132 for a workpiece of different thicknesses so that system 100 may provide an "on the fly" modification of a temporal profile for input laser pulse 104 to impart different magnitudes of residual stress, and different depths of residual stress to a workpiece. In this embodiment, LSP is automated and does not require timely adjustments to the system to account for changes in magnitude and depth of residuals stresses on areas of a workpiece of different thicknesses.

System 100 may further comprise one or more amplifiers 118 that may amplify a modulated laser pulse 116 output from modulator 106 and transmitted through polarizer 117. Amplifier 118 may amplify modulated laser pulse 116 and output an amplified, modulated laser pulse 120 such that amplified, modulated laser pulse 120 may be used for a desired LSP application.

A temporal shape of an amplified, modulated laser pulse 120 may be modified by controlling a shape of modulated input laser pulse 116. A temporal shape of modulated laser pulse 116 may result in further temporal variations in gain derived when modulated input laser pulse 116 passes through amplifier 118. A temporal variation of a gain superimposed on a temporal shape of modulated input laser pulse 116 may create a final temporal shape of amplified, modulated laser pulse 120. Various modifications in a temporal shape of amplified, modulated laser pulse 120 output from system 100 may be used to expand LSP applications.

In one embodiment, a temporal shape modification of amplified, modulated laser pulse 120, is a decrease in rise time on a leading edge of amplified, modulated laser pulse 120. It may be advantageous to minimize a rise time on a leading edge of a laser pulse. A short rise time of less than about 5 ns on a leading edge of a laser pulse may prevent or postpone an occurrence of a dielectric breakdown in transparent overlays used during LSP. By preventing or postponing dielectric breakdowns of transparent overlays, more laser beam energy from amplified, modulated laser pulse 120 may be injected into a target plasma before a dielectric breakdown of a transparent overlay. A dielectric breakdown of a transparent overlay may block amplified, modulated laser pulse 120. Controlling a temporal shape of laser input pulse 104 may customize a leading edge rise time of amplified, modulated laser pulse 120. In one embodiment, temporal shaping of input laser pulse 104 to include more energy in a leading edge, and less energy in a tail edge of input laser pulse 104, with a gain saturation of modulated laser pulse 116 through amplifier 118, will decrease a leading edge rise time of amplified, modulated laser pulse 120.

Figure 3:
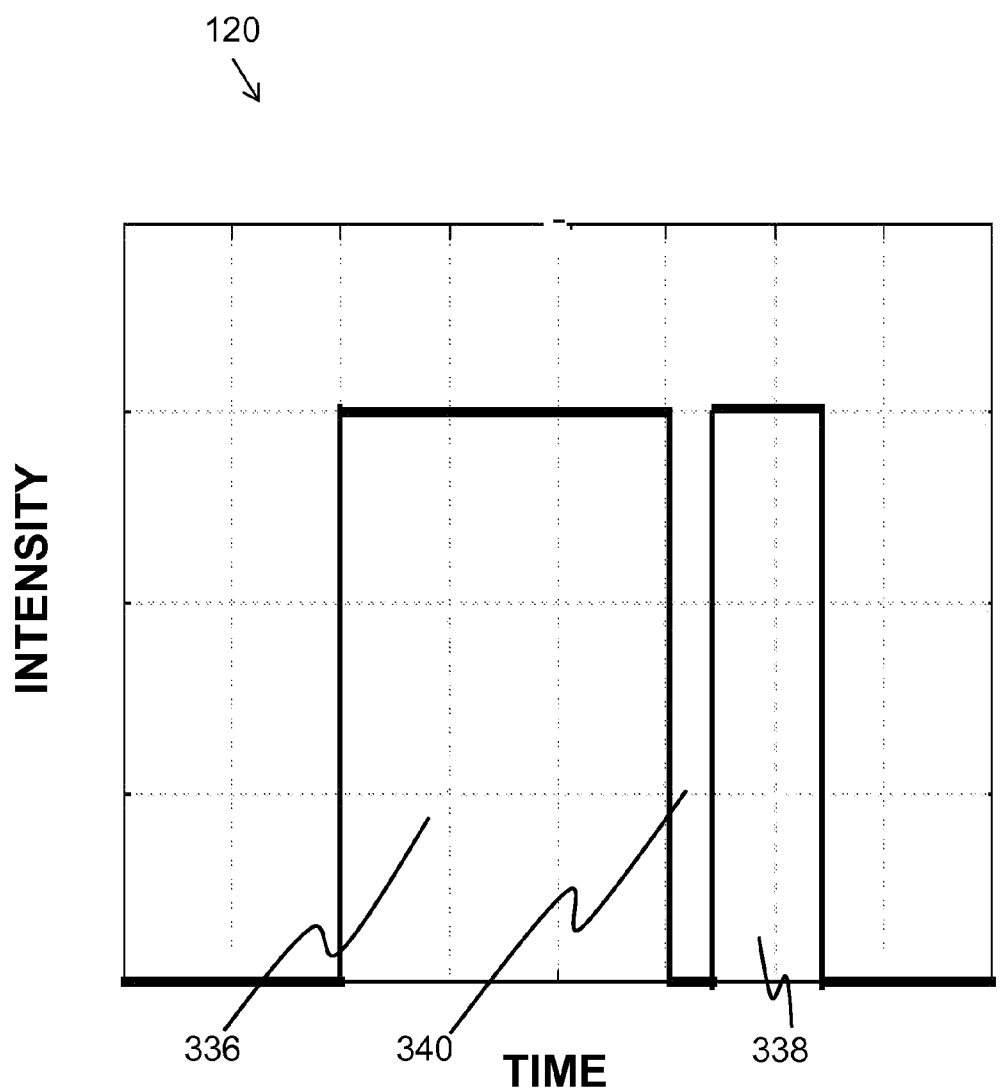
FIG. 3 illustrates an example embodiment of temporal pulse shaping for a pulsed laser beam.

With reference to FIG. 3, an example temporal profile of an amplified, modulated laser pulse 120 is illustrated. Temporal shape modification of amplified, modulated laser pulse 120, includes a single amplified, modulated laser pulse 120 output with a leading edge part 336 having a pulse width of about 20 ns and a trailing edge part 338 having a pulse width of about 10 ns with a brief nanosecond delay 340 between each pulse width. Previously, generation of two individual laser pulses each with a different pulse widths would have been required, with each pulse requiring a manual adjustment of an LSP system to set a pulse width for each pulse. System 100 may be operable to provide a single amplified modulated laser pulse 120 with a temporal pulse shape of varying pulse widths 336, 338 which may reduce time and costs associated with LSP applications.

Figure 4:
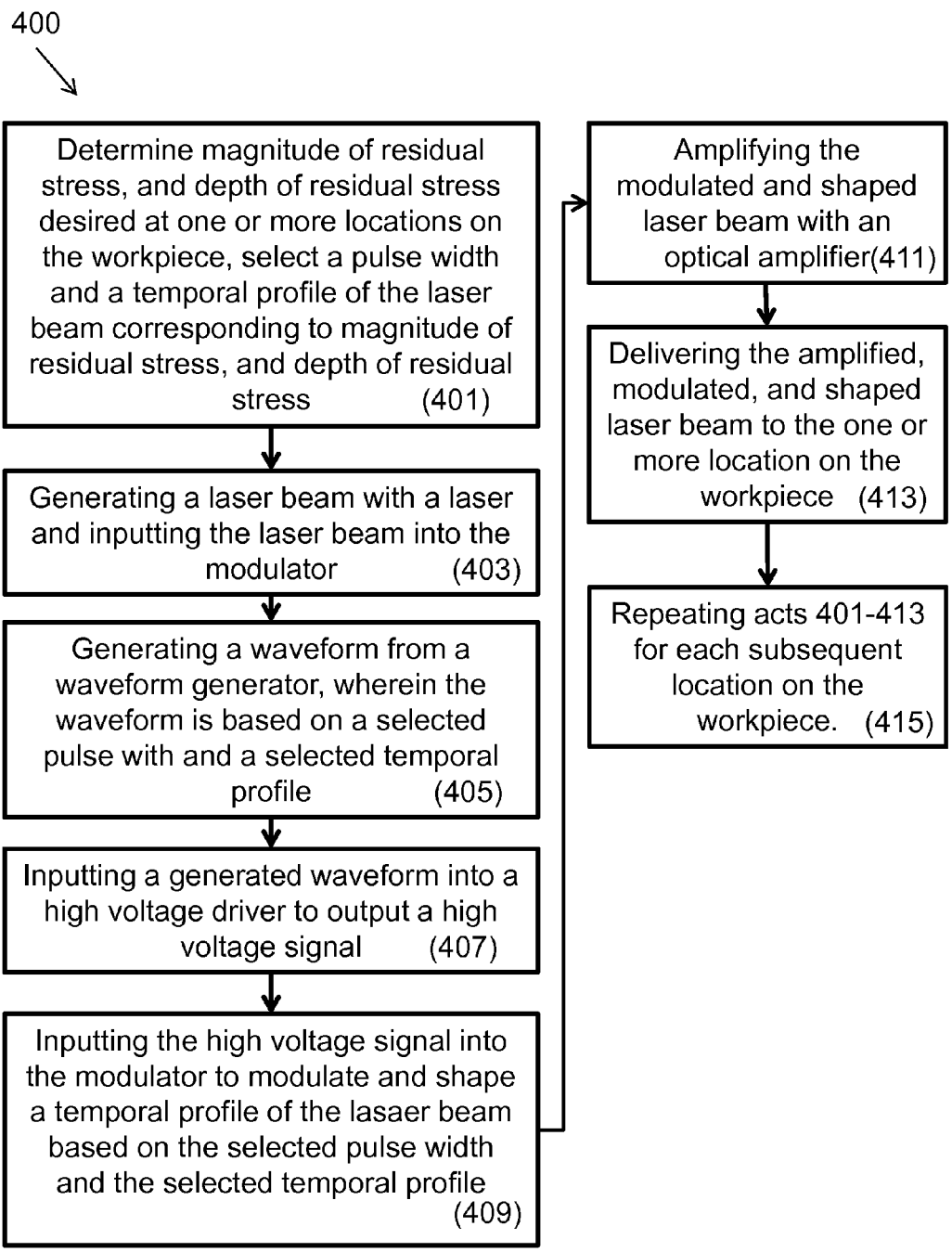
FIG. 4 is a flow chart illustrating an example method for temporal pulse shaping of a laser beam pulse.

FIG. 4 illustrates a flow chart of an example method 400 which may be used for temporal pulse shaping of a laser beam used in LSP of a workpiece. In one embodiment, method 400 includes: determining at least one of a desired magnitude of residual stress, and a desired depth of residual stress, at one or more locations on the workpiece, and selecting a pulse width and a temporal profile of a laser beam corresponding to the at least one of the desired magnitude of residual stress, and the desired depth of residual stress (401); generating a laser beam with a laser and inputting the laser beam into a modulator (403); generating a waveform from a waveform generator, wherein the waveform is based on selected pulse width and selected temporal profile (405); inputting the generated waveform into a high voltage driver to output a high voltage signal (407); inputting the high voltage signal into the modulator to modulate and shape a temporal profile of the laser beam with a polarizer based on the selected pulse width and the selected temporal profile (409); amplifying the modulated and shaped laser beam with an optical amplifier (411); delivering the amplified, modulated, and shaped laser beam to the one or more locations on the workpiece (413); and repeating steps 1-7 for each subsequent location on the workpiece.

The acts of method 400 may also be embedded on a tangible computer readable medium that may be executed by a computer or like processing device to provide one or more instructions to associated hardware for performing the acts of the method. For example, the act of generating a laser beam with a laser may be executed by a computer and like processing device with instructions sent to corresponding laser hardware to generate a laser beam.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. To the extent that the term "includes" or "including" is employed in the detailed description or the claims, it is intended to be inclusive in a manner co-extensive with the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

The invention claimed is:

1. A method for temporal pulse shaping of a laser beam used for laser shock processing of a workpiece, comprising:
    (1) determining at least one of a magnitude and depth of residual stress desired at one or more locations on the workpiece and selecting a pulse width and a temporal profile of the laser beam corresponding to the at least one of a magnitude of residual stress and depth of residual stress;
    (2) inputting the laser beam into a modulator;
    (3) generating a waveform from a waveform generator based on the selected pulse width and the selected temporal profile;
    (4) inputting the generated waveform into a high voltage driver to output a high voltage signal;
    (5) inputting the high voltage signal into the modulator to modulate and shape a temporal profile of the laser beam based on the selected pulse width and the selected temporal profile;
    (6) amplifying the modulated and shaped laser beam; and
    (7) delivering the amplified, modulated, and shaped laser beam to the one or more locations on the workpiece.

2. The method of claim 1, further comprising generating the laser beam with a laser comprising at least one of a continuous wave (CW) laser, a CW fiber laser, a diode pumped (CW) laser; a diode pumped CW fiber laser; and a long pulse laser oscillator.

3. The method of claim 1, wherein the laser beam is input into a modulator comprising at least one of an electro-optic modulator; an acousto-optic modulator; and an electro-optic Pockels cell.

4. The method of claim 1, wherein the pulse width of the laser beam is between 5 ns and 40 ns.

5. The method of claim 1, further comprising operating a processing device to execute instructions to output a time dependent voltage signal from the waveform generator and input the time dependent voltage signal to the high voltage driver, and wherein a time dependent high voltage signal output from the high voltage driver shapes a temporal profile of the laser beam.

* * * * *